United States Patent
Park et al.

(10) Patent No.: US 10,546,551 B2
(45) Date of Patent: Jan. 28, 2020

(54) ELECTRONIC DEVICE AND CONTROL METHOD THEREOF

(71) Applicant: Samsung Electronics Co., Ltd., Suwon-si, Gyeonggi-do (KR)

(72) Inventors: Seong Woong Park, Seoul (KR); Byung Jin Kang, Seoul (KR); Nam Hoi Kim, Suwon-si (KR); Do Hyung Lee, Yongin-si (KR); Sae Rom Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 15/239,321

(22) Filed: Aug. 17, 2016

(65) Prior Publication Data

US 2017/0052623 A1 Feb. 23, 2017

(30) Foreign Application Priority Data

Aug. 18, 2015 (KR) .................. 10-2015-0116324

(51) Int. Cl.
*G06F 3/041* (2006.01)
*G09G 5/00* (2006.01)
(Continued)

(52) U.S. Cl.
CPC ............. *G09G 5/003* (2013.01); *G06F 3/016* (2013.01); *G06F 2203/04105* (2013.01); *G09G 2330/027* (2013.01)

(58) Field of Classification Search
CPC ........ G06F 3/0414; G06F 3/016; G06F 3/165; G06F 3/147; G06F 2203/04105; G09G 5/003; G09G 2330/027; G09G 2354/00
See application file for complete search history.

(56) References Cited

U.S. PATENT DOCUMENTS

| 5,469,193 A | 11/1995 | Giobbi et al. |
| 7,777,730 B2 | 8/2010 | Geurts et al. |

(Continued)

FOREIGN PATENT DOCUMENTS

| EP | 1182606 A2 | 2/2002 |
| KR | 10-2009-0084636 A | 8/2009 |

OTHER PUBLICATIONS

European Search Report dated Jul. 30, 2018, issued in European Patent Application No. 16837314.0.

(Continued)

*Primary Examiner* — Amare Mengistu
*Assistant Examiner* — Jennifer L Zubajlo
(74) *Attorney, Agent, or Firm* — Jefferson IP Law, LLP

(57) ABSTRACT

An electronic device is provided. The electronic device includes a sensor module configured to sense a pressure applied to the electronic device and to send a pressure value corresponding to the sensed pressure to a processor and the processor configured to perform an operation corresponding to the pressure value received from the sensor module, wherein if the sensed pressure belongs to a first interval, the sensor module sends a first pressure value, which represents the first interval, to the processor, wherein if the sensed pressure belongs to a second interval higher than the first interval, the sensor module sends a second pressure value corresponding to the sensed pressure to the processor, and wherein if the sensed pressure belongs to a third interval higher than the second interval, the sensor module sends a third pressure value, which represents the third interval, to the processor.

21 Claims, 11 Drawing Sheets

(51) Int. Cl.
 *G06F 3/16* (2006.01)
 *G06F 3/01* (2006.01)

(56) References Cited

U.S. PATENT DOCUMENTS

| | | | |
|---|---|---|---|
| 7,952,566 | B2 | 5/2011 | Poupyrev et al. |
| 8,760,408 | B2 | 6/2014 | Heesemans et al. |
| 8,780,054 | B2 | 7/2014 | Kim et al. |
| 9,024,870 | B2 | 5/2015 | Kim et al. |
| 9,288,390 | B2 | 3/2016 | Hong et al. |
| 9,304,621 | B1 * | 4/2016 | Wakim ................. G06F 1/1692 |
| 9,703,475 | B2 | 7/2017 | Shinozaki |
| 2007/0222768 | A1 | 9/2007 | Geurts et al. |
| 2008/0024459 | A1 * | 1/2008 | Poupyrev ................ G06F 3/016 |
| | | | 345/173 |
| 2008/0204427 | A1 | 8/2008 | Heesemans et al. |
| 2009/0278807 | A1 * | 11/2009 | Hu ......................... G06F 21/31 |
| | | | 345/173 |
| 2010/0127983 | A1 * | 5/2010 | Irani ................... G06F 3/03543 |
| | | | 345/163 |
| 2012/0154329 | A1 | 6/2012 | Shinozaki |
| 2013/0147706 | A1 * | 6/2013 | Kim ...................... G06F 1/1626 |
| | | | 345/156 |
| 2014/0032623 | A1 * | 1/2014 | Lablans ................... G06F 7/584 |
| | | | 708/252 |
| 2014/0049491 | A1 * | 2/2014 | Nagar ..................... G06F 3/016 |
| | | | 345/173 |
| 2014/0085213 | A1 | 3/2014 | Huppi et al. |
| 2014/0106814 | A1 * | 4/2014 | Schmidt ................ H04W 88/02 |
| | | | 455/556.1 |
| 2014/0168139 | A1 | 6/2014 | Ku |
| 2014/0168494 | A1 * | 6/2014 | Hong ..................... G06F 1/3287 |
| | | | 348/333.01 |
| 2014/0204063 | A1 * | 7/2014 | Kaida ..................... G06F 1/169 |
| | | | 345/184 |
| 2014/0253504 | A1 | 9/2014 | Noshadi et al. |
| 2015/0062052 | A1 * | 3/2015 | Bernstein ............... G06F 3/0416 |
| | | | 345/173 |
| 2015/0301671 | A1 * | 10/2015 | Fan ....................... G06F 3/0414 |
| | | | 715/762 |

OTHER PUBLICATIONS

Silicon Laboratories: "Human Interface Device Tutorial—AN249-Rev. 0.5 3/11", Mar. 1, 2011, pp. 1-52, XP055515025.
Extended Search Report dated Oct. 25, 2018 issued in EP Application 16837314.0.

* cited by examiner $P_1 \leq P < P_2$

ELECTRONIC DEVICE AND CONTROL METHOD THEREOF

CROSS-REFERENCE TO RELATED APPLICATION(S)

This application claims the benefit under 35 U.S.C. § 119(a) of a Korean patent application filed on Aug. 18, 2015 in the Korean Intellectual Property Office and assigned Serial number 10-2015-0116324, the entire disclosure of which is hereby incorporated by reference.

TECHNICAL FIELD

The present disclosure relates to an electronic device including a pressure sensor and a control method thereof.

BACKGROUND

With the development of electronic technologies, various types of electronic products have been developed and supplied. In particular, portable electronic devices, which have a variety of functions, such as a smart phone, a tablet personal computer (PC), and the like have been increasingly used.

Most electronic devices being recently developed are equipped with a display, and a variety of displays, such as an active matrix organic light emitting diode (AMOLED) display, a flexible display, a transparent display, a display with a curved region, and the like, are being developed.

In the case where a display that includes a curved region is used on a side of a portable electronic device, locations of various hardware buttons (e.g., a power button, a volume adjustment button, and the like), which are disposed at the side of a portable electronic device according to the related art, may be changed, or the various hardware buttons may be removed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device capable of providing a user interface, which replaces a hardware button that is removed or of which a location is changed, based on a pressure generated by a user grip while minimizing power consumption and a control method thereof.

In accordance with an aspect of the present disclosure, an electronic device is provided. The electronic device includes a sensor module configured to sense a pressure applied to the electronic device and to send a pressure value corresponding to the sensed pressure to a processor and the processor configured to perform an operation corresponding to the pressure value received from the sensor module, wherein if the sensed pressure belongs to a first interval, the sensor module sends a first pressure value, which represents the first interval, to the processor, wherein if the sensed pressure belongs to a second interval higher than the first interval, the sensor module sends a second pressure value corresponding to the sensed pressure to the processor, and wherein if the sensed pressure belongs to a third interval higher than the second interval, the sensor module sends a third pressure value, which represents the third interval, to the processor.

In accordance with another aspect of the present disclosure, a control method of an electronic device is provided. The control method includes sensing, at a sensor module, a pressure applied to the electronic device, sending a first pressure value, which represents a first interval, to a processor if the sensed pressure belongs to the first interval, sending a second pressure value corresponding to the sensed pressure to the processor if the sensed pressure belongs to a second interval higher than the first interval, and sending a third pressure value, which represents a third interval, to the processor if the sensed pressure belongs to the third interval higher than the second interval, and performing, at the processor, an operation corresponding to the received pressure value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
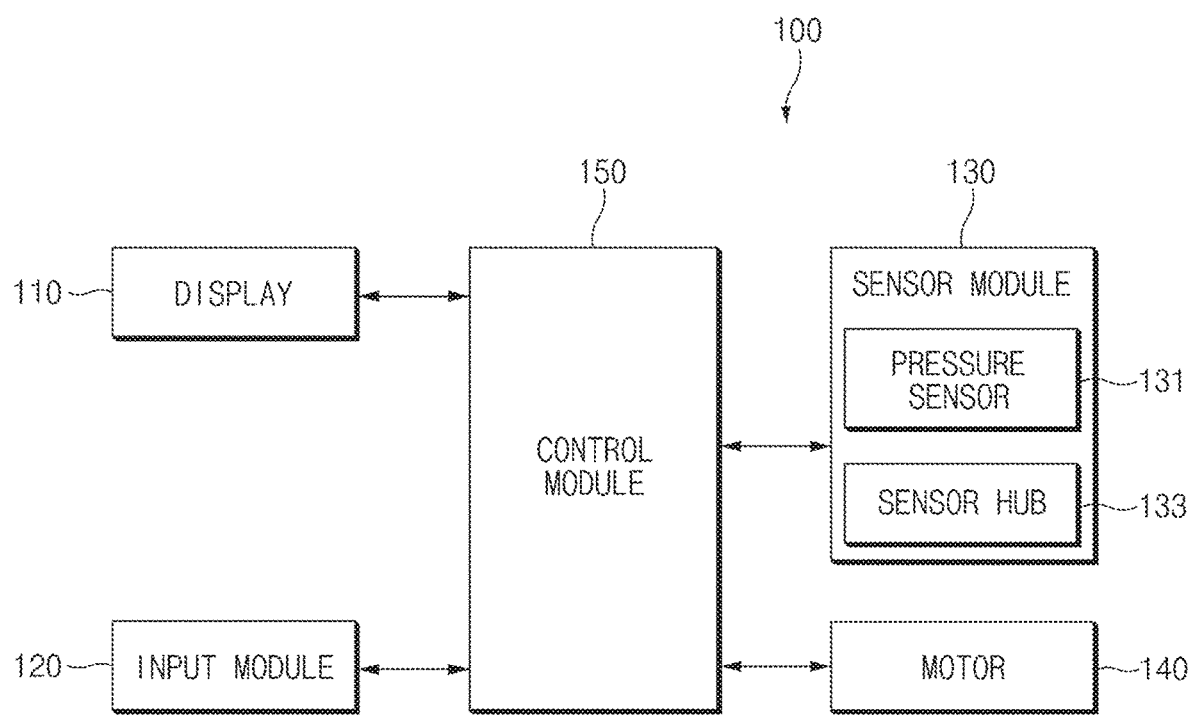
FIG. 1 is a block diagram illustrating a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, "a first user device" and "a second user device" may indicate different user devices regardless of the order or priority thereof. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

For example, an electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group phase 1 or phase 2 (MPEG-1 or MPEG-2) audio layer 3 (MP3) players, mobile medical devices, cameras, or wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

FIG. 1 is a block diagram illustrating a configuration of an electronic device according to an embodiment of the present disclosure.

Referring to FIG. 1, an electronic device 100 may include a display 110, an input module 120, a sensor module 130, a motor 140, and a control module 150.

Content may be displayed on a display screen of the display 110. The content, for example, may include a picture, a video, an application execution screen, a user interface, an icon, a notification message, and the like.

According to an embodiment, the display 110 may include a flat region (or a main display region) and a curved region (or a sub-display region). According to an embodiment, the display 110 may include at least one (e.g., two) curved region. For example, the display 110 may include the curved regions, which are connected with the flat region, at left and right sides of the flat region. According to another embodiment, the display 110 may include only the flat region except the curved region.

The input module 120 may receive a user manipulation. According to an embodiment, the input module 120 may include a touch sensor panel that senses a touch manipulation of a user or a pen sensor panel that senses a pen manipulation of a user. According to an embodiment, the input module 120 may not only sense the user manipulation inputted through a direct contact with the panel (e.g., the touch sensor panel or the pen sensor panel), but it may also sense the user manipulation inputted within a specific distance without a direct contact with the panel.

According to an embodiment, the input module 120 and the display 110, for example, may be implemented with a touch screen that is capable of performing a display function and sensing the touch manipulation at the same time. In the touch screen, the touch sensor panel (or the pen sensor panel) may be disposed on the display panel.

According to an embodiment, the sensor module 130 may sense a state of the electronic device 100. According to an embodiment, the sensor module 130 may include a pressure sensor 131 and a sensor hub 133.

According to an embodiment, the pressure sensor 131 may sense a pressure (or a force) applied to the electronic device 100. According to an embodiment, the pressure sensor 131 may include a force sensing resistor (FSR)

sensor. The FSR sensor may include a FSR device of which the resistance decreases as a pressure (or a force) applied to a surface thereof increases. The FSR sensor may sense the pressure applied to the electronic device 100 based on the resistance change of the FSR device. According to an embodiment, the sensor module 130 may include at least one (e.g., plural) the pressure sensor 131.

According to an embodiment, the sensor module 130 may provide the control module 150 with a pressure value corresponding to the pressure sensed by the pressure sensor 131. According to an embodiment, a pressure value corresponding to the pressure sensed by the pressure sensor 131 may be sent to the control module 150 through the sensor hub 133. According to another embodiment, a pressure value corresponding to the pressure sensed by the pressure sensor 131 may be sent to the control module 150 without going through the sensor hub 133. For example, in the case where the electronic device 100 does not include the sensor hub 133, a pressure value corresponding to the pressure sensed by the pressure sensor 131 may be directly sent to the control module 150.

The sensor hub 133 may control an operation of a sensor (e.g., the pressure sensor 131) included in the sensor module 130. According to an embodiment, the sensor hub 133 may provide the pressure value received from the pressure sensor 131 to the control module 150.

According to an embodiment, the sensor hub 133 may determine an interval (or a range) to which the pressure value received from the pressure sensor 131 belongs. For example, if the received pressure value is less than a first pressure value, the sensor hub 133 may determine that the received pressure value belongs to a first interval. If the received pressure value is greater than or equal to the first pressure value and is less than a second pressure value, the sensor hub 133 may determine that the received pressure value belongs to a second interval. If the received pressure value is greater than or equal to the second pressure value, the sensor hub 133 may determine that the received pressure value belongs to a third interval. According to an embodiment, in the case where the sensor module 130 includes a plurality of pressure sensors 131, the sensor hub 133 may determine an interval (or a range), to which a plurality of pressure values received from the pressure sensors 131 belong, by using a representative value of the pressure values received from the pressure sensors 131. For example, the sensor hub 133 may determine an interval, to which a plurality of pressure values belong, by using an average value of the pressure values received from the pressure sensors 131. As another example, the sensor hub 133 may determine an interval, to which a plurality of pressure values belong, by using a maximum value of the pressure values.

According to an embodiment, the sensor hub 133 may send a pressure value to the control module 150 based on an interval to which the pressure value received from the pressure sensor 131 belongs.

The motor 140 may convert an electrical signal into a mechanical vibration. According to an embodiment, the motor 140 may generate the following effects: vibration, haptic effect, and the like. For example, if the pressure sensor 131 senses a pressure of a specific interval, the motor 140 may generate a haptic effect under control of the control module 150.

The control module 150 may control overall operations of the electronic device 100. For example, the control module 150 may respectively control elements (e.g., the display 110, the input module 120, and the sensor module 130) of the electronic device 100 and process information (or interrupt or command) received from the elements.

According to an embodiment, the control module 150 may be a system on chip (SoC) (e.g., an AP) that includes a processor (or a CPU), a graphics processing unit (GPU), a video processor, and the like.

According to an embodiment, the control module 150 may perform an operation that corresponds to the pressure value received from the sensor module 130. According to an embodiment, the control module 150 may receive a pressure value from the sensor hub 133 or may directly receive a pressure value from the pressure sensor 131. According to an embodiment, the control module 150 may determine an interval (or a range) to which the pressure value received from the sensor module 130 belongs. For example, if the received pressure value is less than the first pressure value, the control module 150 may determine that the received pressure value belongs to the first interval. If the received pressure value is greater than or equal to the first pressure value and is less than the second pressure value, the control module 150 may determine that the received pressure value belongs to the second interval. If the received pressure value is greater than or equal to the second pressure value, the control module 150 may determine that the received pressure value belongs to the third interval. According to an embodiment, in the case where a plurality of pressure values are received from the pressure sensors 131, the control module 150 may determine an interval (or a range), to which the received pressure values belong, by using a representative value of the received pressure values. For example, the control module 150 may determine an interval, to which a plurality of pressure values belong, by using an average value of the pressure values received from the pressure sensors 131. As another example, the control module 150 may determine an interval, to which a plurality of pressure values belong, by using a maximum or minimum value of the pressure values received from the pressure sensors 131.

According to an embodiment, if a pressure value of a specific interval (e.g., the second interval) is received from the sensor module 130 (e.g., the pressure sensor 131 or the sensor hub 133), the control module 150 may generate a haptic effect by using the motor 140. For example, if a pressure value that is greater than or equal to the first pressure value and is less than the second pressure value is received, the control module 150 may generate a haptic effect by using the motor 140. If a pressure value that is greater than or equal to the first pressure value and is less than the second pressure value is received, the control module 150 may generate a haptic effect corresponding to the received pressure value by using the motor 140. For example, as the received pressure value becomes greater, a magnitude of a haptic effect may become greater. As another example, as the received pressure value becomes greater, the duration of the haptic effect may become longer or shorter.

According to an embodiment, if a pressure value of a specific interval (e.g., a pressure value that belongs to the second interval) is received from the sensor module 130 (e.g., the pressure sensor 131 or the sensor hub 133), the control module 150 may apply a blur effect to a display screen. This will be described later with reference to FIGS. 4A to 4C.

According to an embodiment, if a pressure value of a specific interval (e.g., a pressure value that belongs to the second interval) is received from the sensor module 130 (e.g., the pressure sensor 131 or the sensor hub 133), the control module 150 may display a volume adjustment object on the display screen. This will be described later with reference to FIGS. 5A to 5C.

Figure 2A:
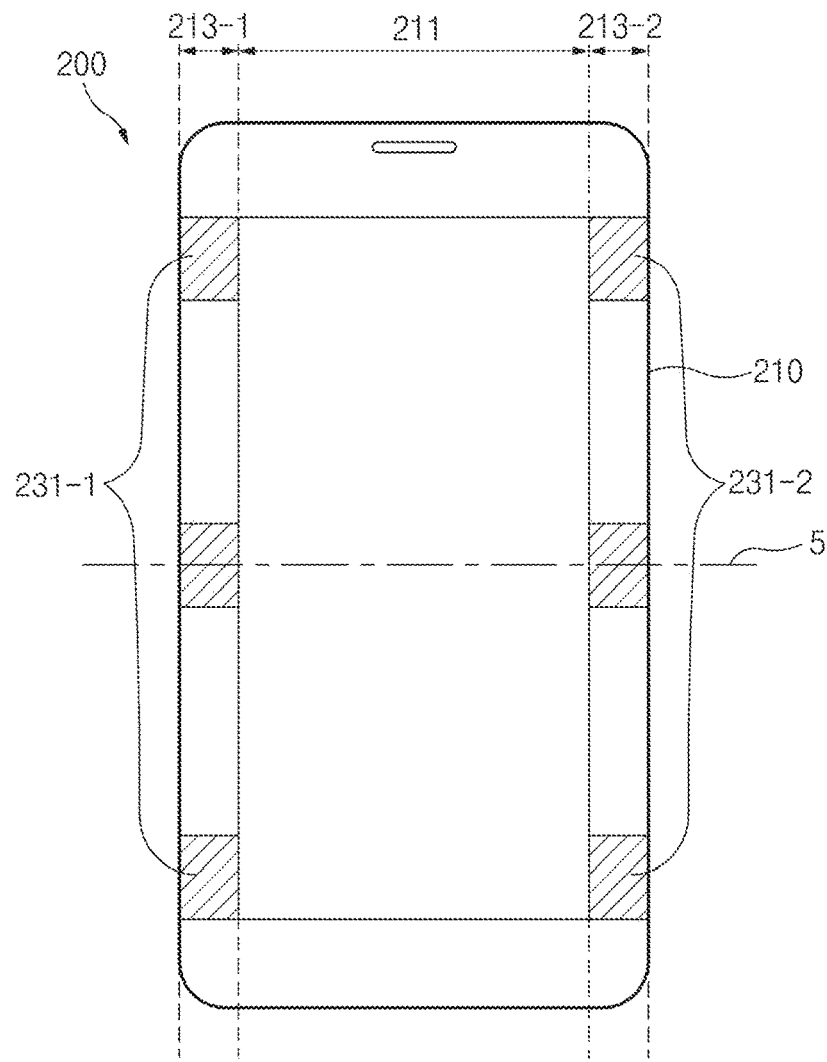
FIGS. 2A and 2B are diagrams illustrating a location of a pressure sensor according to various embodiments of the present disclosure.
Figure 2B:
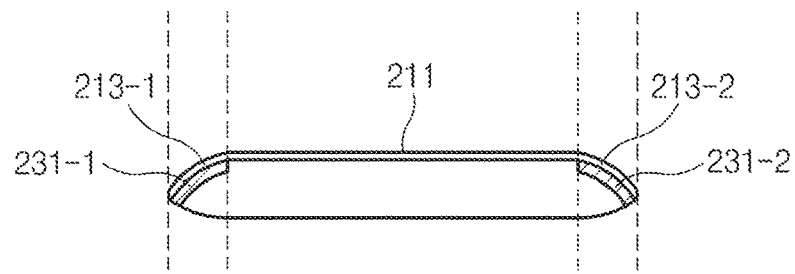

FIGS. 2A and 2B are diagrams illustrating a location of a pressure sensor according to various embodiments of the present disclosure.

FIG. 2A is a front view of an electronic device 200 (e.g., the electronic device 100 of FIG. 1), and FIG. 2B is a section of the electronic device 200 (e.g., the electronic device 100 of FIG. 1) taken along line 5 in a horizontal direction.

Referring to FIGS. 2A and 2B, a display 210 (e.g., the display 110 of FIG. 1) may include a flat region (or a main display region) 211 and a curved region (or a sub-display region) 213-1 or 213-2. According to an embodiment, the display 210 may include at least one (e.g., two) curved region.

According to an embodiment, a pressure sensor (231-1, 231-2) (e.g., the pressure sensor 131 of FIG. 1) may be disposed under at least a portion of the curved region (213-1, 213-2). For example, referring to FIGS. 2A and 2B, a plurality of pressure sensors 231-1 and 231-2 may be disposed under the curved region (213-1, 213-2) and may be spaced apart from each other by a specific distance. According to various embodiments, the pressure sensor (231-1, 231-2) may be disposed at the flat region 211 of the display 210 as well as in the curved region (213-1, 213-2) of the display 210. According to various embodiments, the pressure sensor (231-1, 231-2) may be disposed on an upper portion (e.g., an upper portion of the display 210) or a lower portion (e.g., a lower portion of the display 210) of a front surface of the electronic device 200. According to an embodiment, the pressure sensors 231-1 and 231-2 may sense the pressures applied to the electronic device 200 at the specific locations.

According to an embodiment, the pressure sensor (231-1, 231-2) may include a left pressure sensor 231-1 and a right pressure sensor 231-2. Referring to FIGS. 2A and 2B, the left pressure sensor 231-1 may be disposed at the left side (or a left curved region of the display 210) of the electronic device 200 and sense a pressure applied from the left of the electronic device 200. The right pressure sensor 231-2 may be disposed at the right side (or a right curved region of the display 210) of the electronic device 200 and sense a pressure applied from the right of the electronic device 200. According to an embodiment, the pressure sensor (231-1, 231-2) may include the plurality of left pressure sensors 231-1 and the plurality of right pressure sensors 231-2.

Figure 3A:
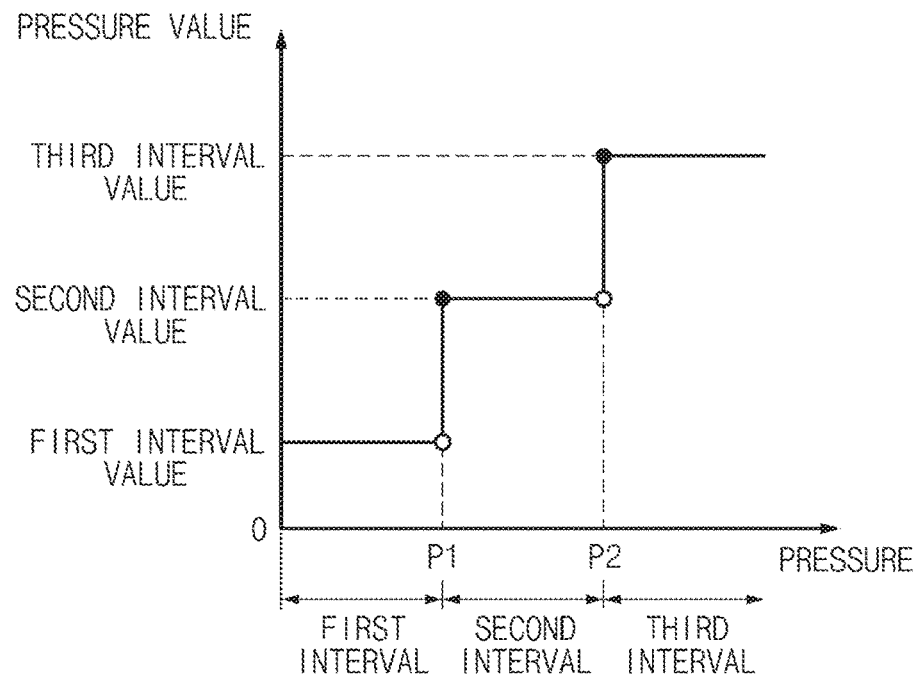
FIGS. 3A and 3B are graphs illustrating a pressure value provided to a control module according to various embodiments of the present disclosure.
Figure 3B:
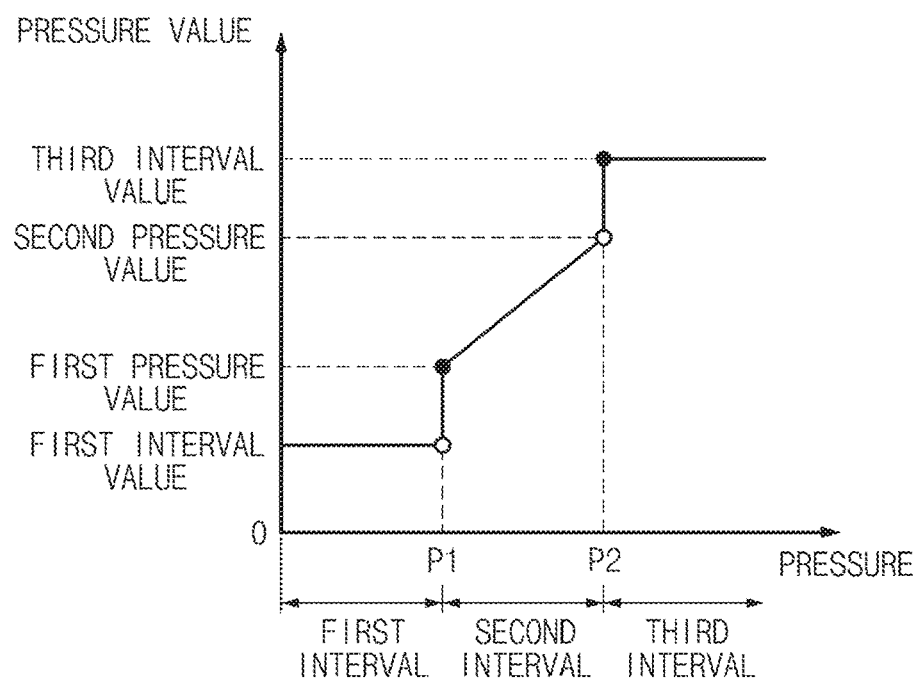

FIGS. 3A and 3B are graphs illustrating a pressure value provided to a control module according to various embodiments of the present disclosure.

In graphs illustrated in FIGS. 3A and 3B, X-axis indicates the pressure sensed by a pressure sensor (e.g., the pressure sensor 131), and Y-axis indicates a pressure value sent from a sensor hub (e.g., the sensor hub 133) to a control module (e.g., the control module 150).

Referring to FIG. 3A, the sensor hub may provide the control module with a pressure value (i.e., an interval value) that represents an interval to which a pressure belongs. For example, if the pressure received from the pressure sensor belongs to a first interval, the sensor hub may provide the control module with a pressure value (e.g., a first interval value) that represents the first interval. If the pressure received from the pressure sensor belongs to a second interval, the sensor hub may provide the control module with a pressure value (e.g., a second interval value) that represents the second interval. If the pressure received from the pressure sensor belongs to a third interval, the sensor hub may provide the control module with a pressure value (e.g., a third interval value) that represents the third interval.

According to an embodiment, if an interval to which a pressure belongs is changed if the sensor hub sends an interval value to the control module, the sensor hub may send an interval value of the changed interval to the control module. For example, if a pressure, which belongs to an interval different from an interval to which the pressure received shortly before belongs, is received from the pressure sensor, the sensor hub may send an interval value of the changed interval to the control module. If a pressure, which belongs to an interval that is the same as an interval to which the pressure received shortly before belongs, is received from the pressure sensor, the sensor hub may not send an interval value to the control module.

Power may be consumed unnecessarily in the case where all pressure values respectively corresponding to the pressures sensed by a pressure sensor are sent to the control module, but according to the above-described embodiment, the power consumption may be reduced by sending an interval value of an interval to which the sensed pressure belongs to the control module in the case where an interval is changed.

Referring to FIG. 3B, if the pressure received from the pressure sensor belongs to a specific interval (e.g., the second interval), the sensor hub may send a pressure value corresponding to the received pressure to the control module. If the pressure received from the pressure sensor belongs to another interval, the sensor hub may send a pressure value that represents an interval to which the received pressure belongs. For example, if the pressure received from the pressure sensor belongs to the second interval, the sensor hub may provide the control module with the pressure value corresponding to the received pressure, and if the pressure received from the pressure sensor belongs to the first or third interval, the sensor hub may provide the control module with a pressure value (i.e., the first or third interval value) that represents an interval to which the pressure belongs.

According to an embodiment, in the case where the sensor module includes a plurality of pressure sensors, the sensor hub may provide the control module with a representative value that represents pressure values respectively corresponding to the pressures received from the pressure sensors if the pressures received from the pressure sensors belong to the second interval. For example, the sensor hub may provide the control module with an average value, a maximum value, or a minimum value of pressure values respectively corresponding to the pressures received from a plurality of pressure sensors. As another example, the sensor hub may provide the control module with a representative value (e.g., an average value) of pressure values respectively corresponding to pressures, which belong to the second interval, from among the pressures received from a plurality of pressure sensors.

According to an embodiment, if the pressure received from the pressure sensor belongs to the second interval, the sensor hub may provide the control module with a pressure value corresponding to the received pressure regardless of an interval change. That is, if the received pressure belongs to the first or third interval, the sensor hub may compare the received pressure with the pressure received shortly before. If the comparison result indicates that an interval is changed, the sensor hub may provide the control module with a pressure value of the changed interval. If the received pressure belongs to the second interval, the sensor hub may provide the control module with a pressure value corresponding to the pressure received from the pressure sensor regardless of an interval change.

Power may be consumed unnecessarily in the case where all pressure values respectively corresponding to the pressures sensed by the pressure sensor are sent to the control module, but according to the above-described embodiment, the power consumption may be reduced by sending a pressure value corresponding to a pressure, which belongs to a specific interval, to the control module in real time and by sending, when an interval is changed, a pressure value corresponding to the changed interval to the control module, with regard to a pressure that leaves a designated interval.

Figure 4A:
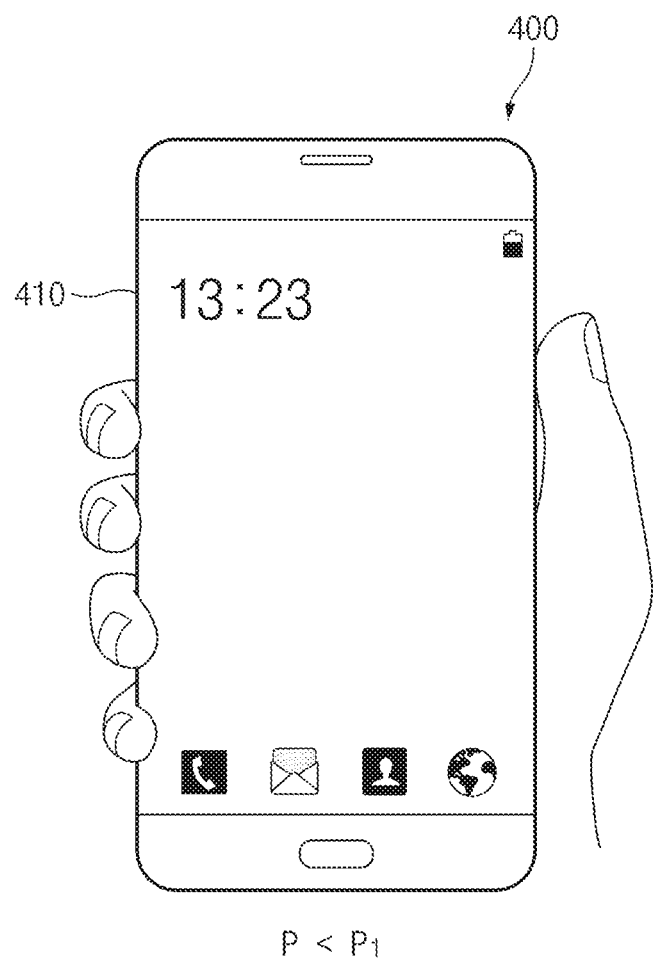
FIGS. 4A to 4C are diagrams illustrating an operation for applying a blur effect to a display screen according to various embodiments of the present disclosure.
Figure 4B:
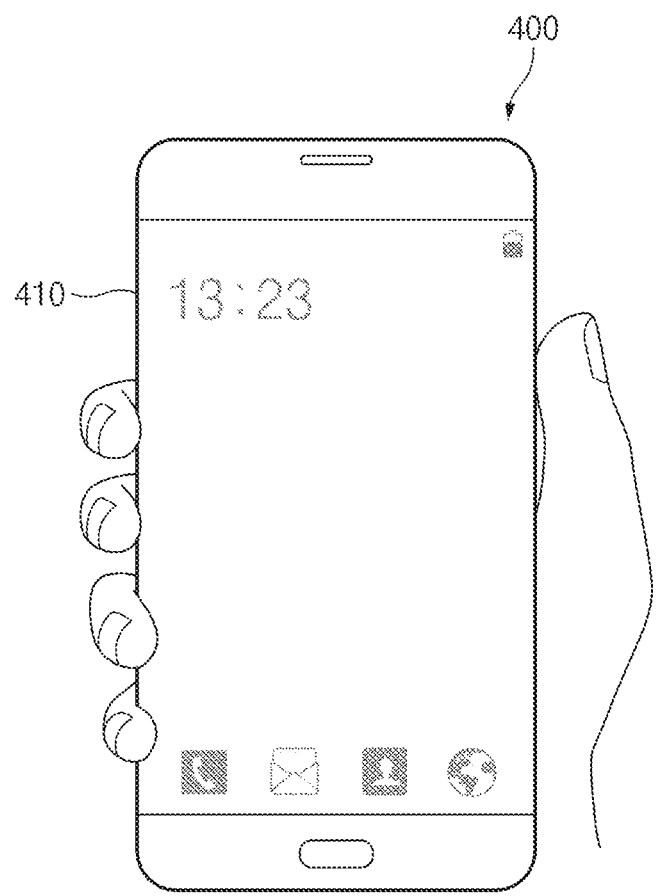
Figure 4C:
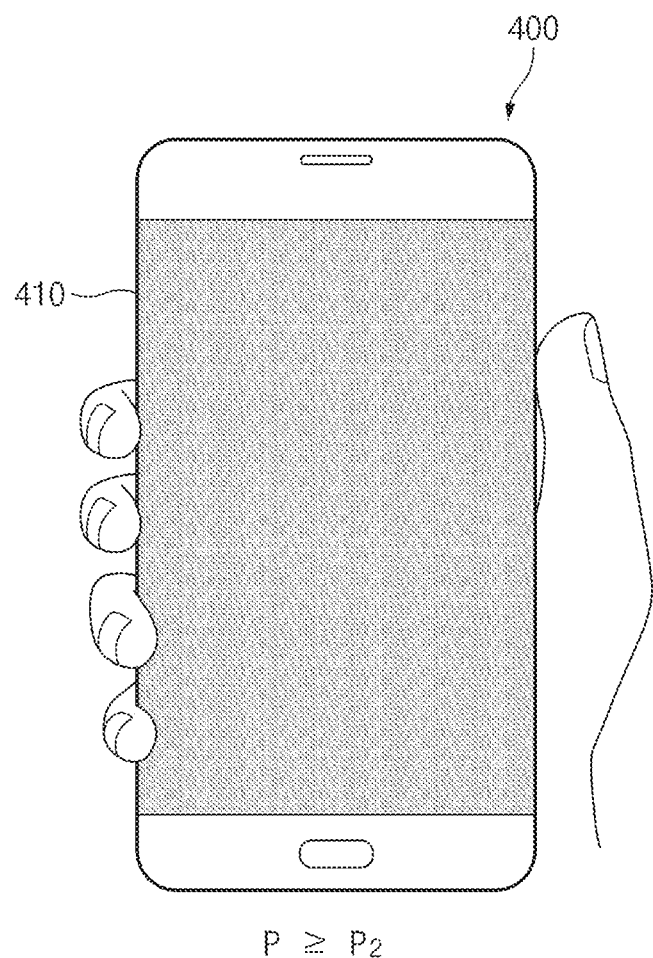

FIGS. 4A to 4C are diagrams illustrating an operation for applying a blur effect to a display screen according to various embodiments of the present disclosure.

Referring to FIG. 4A, a user may apply a pressure to an electronic device 400 (e.g., the electronic device 100 of FIG. 1) while gripping the electronic device 400. If a pressure P applied to the electronic device 400 is less than a first pressure P1, a control module (e.g., the control module 150 of FIG. 1) may receive a pressure value corresponding to a pressure that is less than the first pressure P1. According to an embodiment, if a pressure value corresponding to a pressure (e.g., a pressure value corresponding to a pressure that belongs to the first interval) less than the first pressure P1 is received, the control module may not perform any operation.

According to an embodiment, if a pressure value corresponding to a pressure of a specific interval (e.g., a pressure value corresponding to a pressure that belongs to the second interval) is received from a sensor module (e.g., the sensor module 130 of FIG. 1), the control module may apply a blur effect to a display screen. For example, referring to FIG. 4B, if the pressure P applied to the electronic device 400 is greater than or equal to the first pressure P1 and is less than the second pressure P2, the pressure value corresponding to the pressure P may be sent to the control module. According to an embodiment, if a pressure value that is greater than or equal to the first pressure value corresponding to the first pressure P1 and is less than the second pressure value corresponding to the second pressure P2 is received, the control module may generate the blur effect on the display screen. According to an embodiment, if a pressure value that is greater than or equal to the first pressure value corresponding to the first pressure P1 and is less than the second pressure value corresponding to the second pressure P2 is received, the control module 150 may generate a blur effect of a magnitude, which corresponds to the received pressure value, on the display screen. That is, as the pressure applied to the electronic device 400 becomes greater, a magnitude of the blur effect may become greater.

According to an embodiment, if a pressure value corresponding to a pressure that is greater than or equal to the second pressure P2 (e.g., a pressure value corresponding to a pressure that belongs to the third interval) is received, the control module may turn off power to a display 410. For example, referring to FIG. 4C, if the pressure P applied to the electronic device 400 is greater than or equal to the second pressure P2, power of the display 410 may be turned off.

According to an embodiment described with reference to FIGS. 4A to 4C, a user may conveniently turn off power to the display 410 without a separate input of touching a power button while gripping the electronic device 400. A user experience may be maximized by providing a visual effect that is changed according to a pressure value that corresponds to a specific pressure interval (e.g., from the first pressure P1 to the second pressure P2).

Figure 5A:
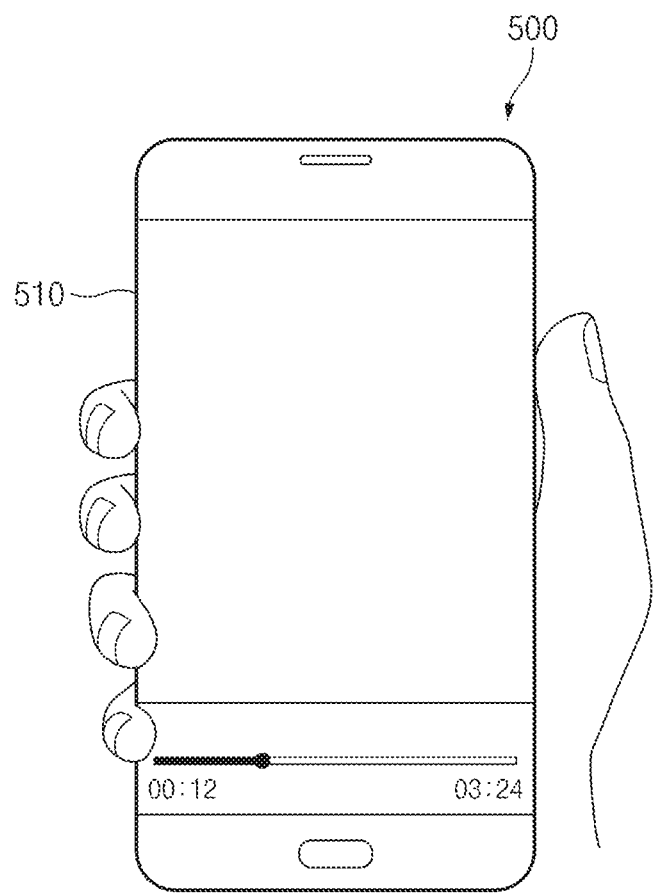
FIGS. 5A to 5C are diagrams illustrating an operation for displaying a volume adjustment object on a display according to various embodiments of the present disclosure.
Figure 5B:
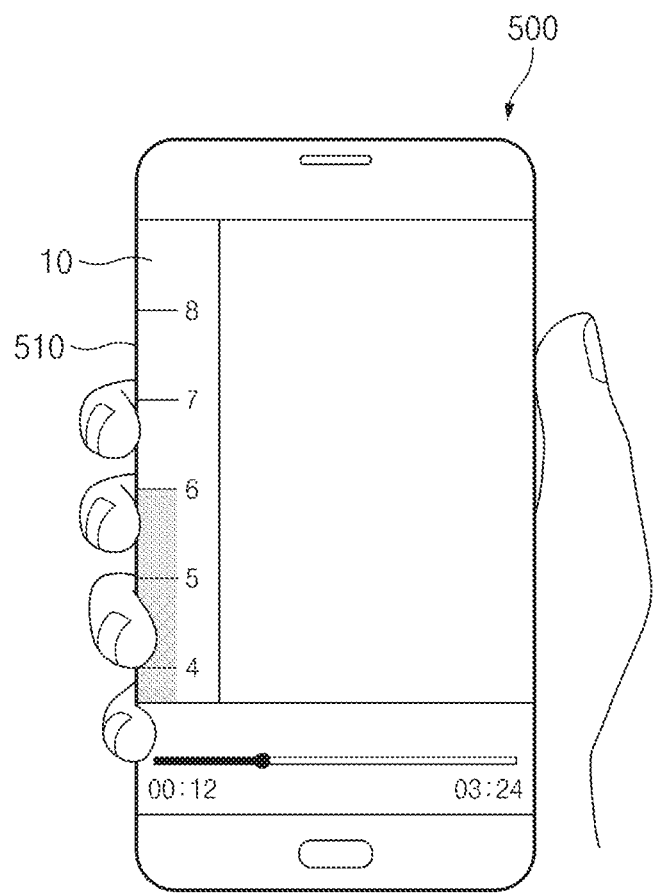
Figure 5C:
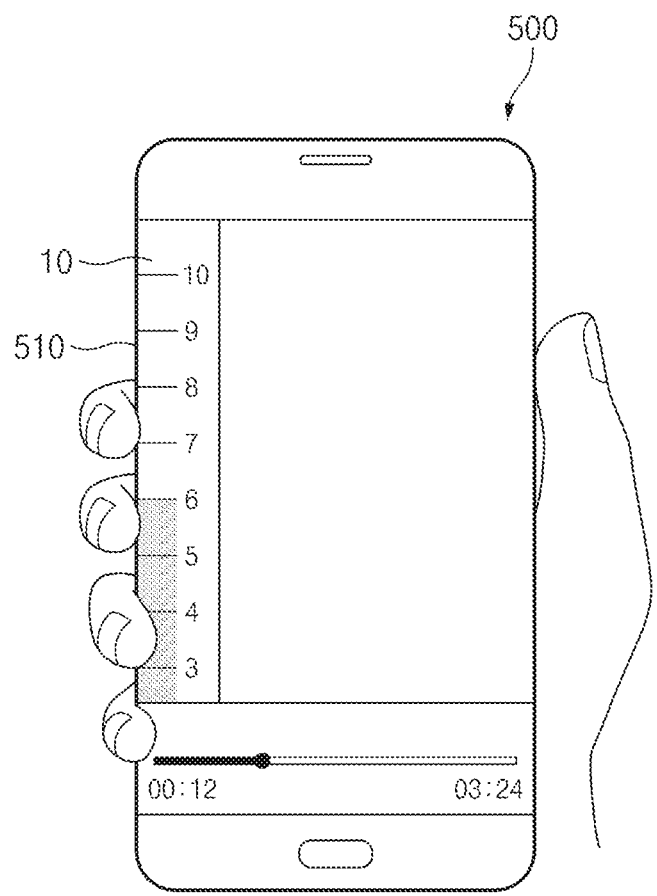

FIGS. 5A to 5C are diagrams illustrating an operation for displaying a volume adjustment object on a display according to various embodiments of the present disclosure.

Referring to FIG. 5A, a user may apply a pressure to an electronic device 500 while gripping the electronic device 500 (e.g., the electronic device 100 of FIG. 1). If the pressure P applied to the electronic device 500 is less than the first pressure P1, a control module (e.g., the control module 150 of FIG. 1) may receive a pressure value corresponding to a pressure that is less than the first pressure P1. According to an embodiment, if a pressure value (e.g., a pressure value corresponding to a pressure that belongs to the first interval) corresponding to a pressure less than the first pressure P1 is received, the control module may not perform any operation.

According to an embodiment, if a pressure value of a specific interval (e.g., a pressure value corresponding to a pressure that belongs to the second interval) is received from a sensor module (e.g., the sensor module 130 of FIG. 1), the control module may display a volume adjustment object 10 on a display screen. For example, referring to FIGS. 5B and 5C, if the pressure P applied to the electronic device 500 is greater than or equal to the first pressure P1 and is less than the second pressure P2, a pressure value corresponding to the pressure P may be sent to the control module. According to an embodiment, if a pressure value that is greater than or equal to the first pressure value and is less than the second pressure value is received, the control module may display the volume adjustment object 10 on the display screen. According to an embodiment, if a pressure value that is greater than or equal to the first pressure value and is less than the second pressure value is received, the control module may display the volume adjustment object 10 that indicates a volume adjustment interval corresponding to the received pressure value. For example, as a magnitude of a pressure applied to the electronic device 500 becomes greater, a range of the volume adjustment interval (or a volume adjustment range) may become greater. As another example, as a magnitude of a pressure applied to the electronic device 500 becomes greater, a range of the volume adjustment interval may become smaller.

According to an embodiment described with reference to FIGS. 5A to 5C, the volume adjustment object 10 may be displayed on a display 510 without a user's separate manipulation while gripping the electronic device 500. Furthermore, a user may change the volume adjustment interval of the volume adjustment object 10 while gripping the electronic device 500. In the case where the user wants to greatly adjust a volume with one user manipulation, the user may apply a high pressure to the electronic device 500 such that the volume adjustment interval (or the volume adjustment range) that indicates a wide range of volume is displayed on the display 510. Alternatively, to adjust a volume minutely, the user may apply a low pressure to the electronic device 500 such that the volume adjustment interval that indicates a narrow range of volume is displayed on the display 510. Accordingly, even though the electronic device 500 does not include a volume adjustment button, the user may adjust a volume through the volume adjustment object 10, and thus, the user may conveniently adjust the volume depending on the situation.

According to an embodiment, the control module (e.g., the control module 150 of FIG. 1) may differently set the amount of volume level to be adjusted (hereinafter refer to as "volume adjustment") based on a speed of a flick manipulation. For example, as the speed of the user flick manipulation becomes faster, the volume adjustment may become greater. According to an embodiment, the control module may differently set the volume adjustment corresponding to a user's flick manipulation, based on the received pressure value. For example, even though a flick manipulation of the same speed is inputted, the control module may set the volume adjustment such that the volume adjustment becomes higher as the received pressure value becomes greater.

Figure 6:
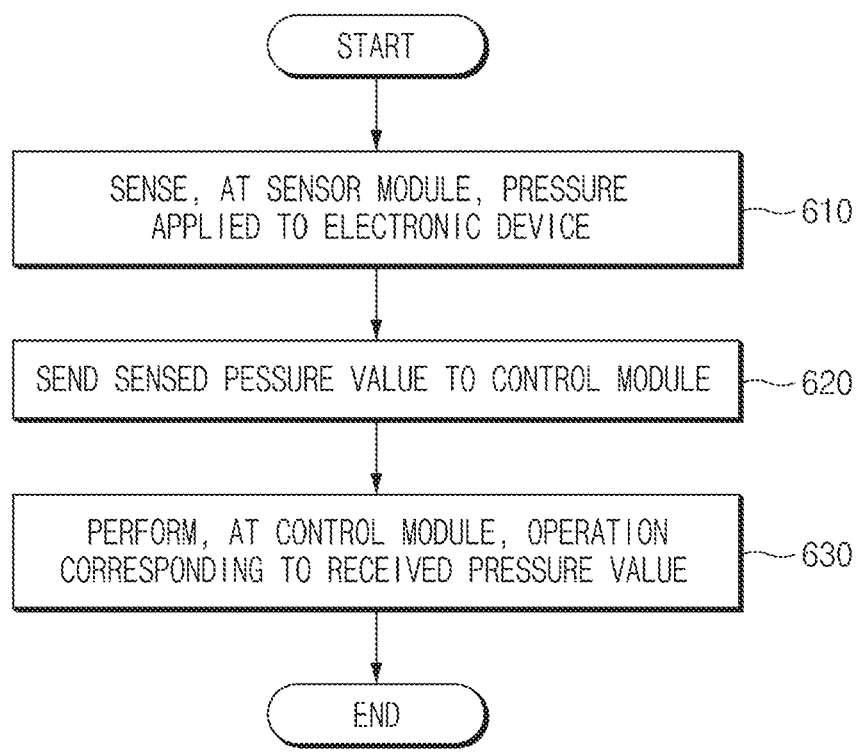
FIG. 6 is a flowchart illustrating a method for controlling an electronic device according to an embodiment of the present disclosure.

FIG. 6 is a flowchart illustrating a method for controlling an electronic device according to an embodiment of the present disclosure.

A flowchart illustrated in FIG. 6 may include operations that the electronic device 100 illustrated in FIG. 1 processes. Therefore, even though omitted below, contents of the electronic device 100 described with reference to FIGS. 1, 2A, 2B, 3A, 3B, 4A to 4C, and 5A to 5C may be applied to the flowchart shown in FIG. 6.

Referring to FIG. 6, in operation 610, the electronic device 100 may sense a pressure applied thereto. According to an embodiment, the electronic device 100 may sense a pressure applied thereto by using a sensor module that includes at least one (e.g., a plurality) pressure sensor.

According to an embodiment, in operation 620, the sensor module may send a pressure value corresponding to the sensed pressure to a control module. According to an embodiment, a pressure value corresponding to the sensed pressure may be directly sent from the pressure sensor to the control module through a sensor hub. According to an embodiment, in the case where a pressure value corresponding to the sensed pressure is sent to the control module through the sensor hub, the sensor module may determine an interval (or a range) to which the sensed pressure belongs. For example, if the received pressure value is less than the first pressure value, the control module may determine that the sensed pressure belongs to the first interval. If the received pressure value is greater than or equal to the first pressure value and is less than the second pressure value, the control module may determine that the sensed pressure belongs to the second interval. If the received pressure value is greater than or equal to the second pressure value, the control module may determine that the sensed pressure belongs to the third interval. According to an embodiment, in the case where the sensor module includes a plurality of pressure sensors, the control module may determine an interval (or a range), to which a plurality of pressure values corresponding to the pressures received from the pressure sensors belong, by using a representative value of the pressure values corresponding to the pressures received from the plurality of pressure sensors.

According to an embodiment, the sensor module may provide the control module with a pressure value corresponding to the sensed pressure based on an interval to which the sensed pressure belongs. According to an embodiment, the sensor module may provide the control module with a pressure value (i.e., an interval value) that represents an interval to which the pressures belong. According to an embodiment, if an interval to which the pressure belongs is changed when the sensor module sends an interval value to the control module, the sensor module may send an interval value of the changed interval to the control module.

According to an embodiment, if the sensed pressure belongs to a specific interval (e.g., the second interval), the sensor module may send a pressure value corresponding to the sensed pressure to the control module. If the sensed pressure belongs to another interval, the sensor module may send a pressure value that represents an interval to which the sensed pressure belongs.

According to an embodiment, a pressure value may be directly sent from the pressure sensor to the control module. For example, in the case where the electronic device 100 does not include the sensor hub 133, a pressure value corresponding to the pressure sensed by the pressure sensor may be directly sent to the control module.

According to an embodiment, in operation 630, the electronic device 100 may perform an operation corresponding to the pressure value sent to the control module under control of the control module. According to an embodiment, the control module may determine an interval (or a range) to which the pressure value received from the sensor module belongs. For example, if the received pressure value is less than the first pressure value, the control module may determine that the received pressure value belongs to the first interval. If the received pressure value is greater than or equal to the first pressure value and is less than the second pressure value, the control module may determine that the received pressure value belongs to the second interval. If the received pressure value is greater than or equal to the second pressure value, the control module may determine that the received pressure value belongs to the third interval. According to an embodiment, in the case where a plurality of pressure values are received from a plurality of the pressure sensors, the control module 150 may determine an interval (or range) to which the received pressure values belong based on a representative value that represents the received pressure values.

According to an embodiment, if the control module receives a pressure value corresponding to a pressure that belongs to the second interval, the electronic device 100 may generate a haptic effect. For example, if the control module receives a pressure value (i.e., a pressure value corresponding to a pressure that belong to the second interval) that is greater than or equal to the first pressure value and is less than the second pressure value, the electronic device 100 may generate the haptic effect. According to an embodiment, if the control module receives a pressure value corresponding to a pressure that belongs to the second interval, the electronic device 100 may generate a haptic effect corresponding to the received pressure value. For example, as the pressure value corresponding to the sensed pressure becomes greater, a magnitude of the haptic effect may become greater. As another example, as the pressure value corresponding to the sensed pressure becomes greater, the duration of the haptic effect may be longer or shorter.

According to an embodiment, if the control module receives a pressure value corresponding to a pressure that belongs to the second interval, the electronic device 100 may apply a blur effect to a display screen. For example, if the control module receives a pressure value that is greater than or equal to the first pressure value and is less than the second pressure value, the electronic device 100 may apply the blur effect to the display screen. According to an embodiment, the electronic device 100 may apply a blur effect of a magnitude that corresponds to the pressure value provided to the control module. For example, as the pressure value provided to the control module becomes greater, the blur may be emphasized and displayed. According to an embodiment, if the control module receives a pressure value (e.g., a pressure value that is greater than or equal to the second pressure value) corresponding to a pressure that belongs to the third interval, the electronic device 100 may turn off power to the display.

According to an embodiment, if the control module receives a pressure value corresponding to a pressure that belongs to the second interval, the electronic device 100 may display a volume adjustment object on the display. For example, if the control module receives a pressure value that is greater than or equal to the first pressure value and is less than the second pressure value, the electronic device 100 may display the volume adjustment object on the display. According to an embodiment, the electronic device 100 may differently display a volume adjustment interval of the volume adjustment object so as to correspond to a pressure value provided to the control module. For example, as a magnitude of a pressure applied to the electronic device 100 becomes greater, a range of the volume adjustment interval (a volume adjustment range) may become greater. As another example, as a magnitude of a pressure applied to the electronic device 100 becomes smaller, a range of the volume adjustment interval (a volume adjustment range) may become smaller.

According to an embodiment, the electronic device 100 may differently set a volume adjustment, which is adjusted according to a user flick manipulation, based on the pressure value received by the control module. For example, if the control module receives a pressure value corresponding to a pressure that belongs to the second interval, even though the same speed of the flick manipulation is inputted, the electronic device 100 may set the volume adjustment such that the volume adjustment becomes higher as the received pressure value becomes greater.

Figure 7:
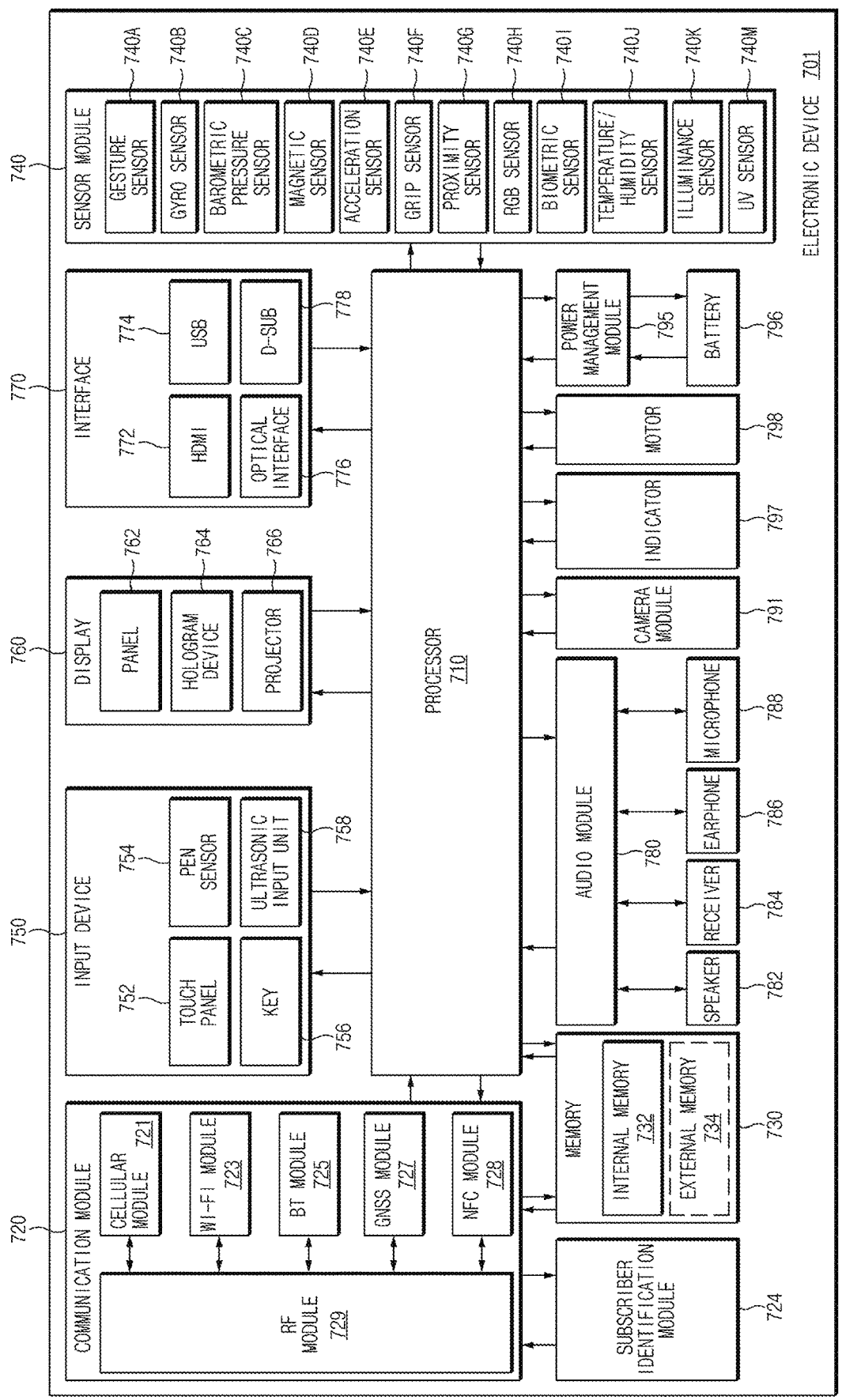
FIG. 7 is a block diagram of an electronic device according to an embodiment of the present disclosure.

FIG. 7 is a block diagram of an electronic device according to an embodiment of the present disclosure.

An electronic device 701 may include, for example, all or a part of the electronic device 100 illustrated in FIG. 1. The electronic device 701 may include one or more processors (e.g., an AP) 710, a communication module 720, a subscriber identification module 724, a memory 730, a sensor module 740, an input device 750, a display 760, an interface 770, an audio module 780, a camera module 791, a power management module 795, a battery 796, an indicator 797, and a motor 798.

The processor 710 may drive an operating system (OS) or an application program to control a plurality of hardware or software elements connected to the processor 710 and may process and compute a variety of data. The processor 710 may be implemented with an SoC, for example. According to an embodiment of the present disclosure, the processor 710 may further include a GPU and/or an image signal processor. The processor 710 may include at least a part (e.g., a cellular module 721) of elements illustrated in FIG. 7. The processor 710 may load and process an instruction or data, which is received from at least one of other components (e.g., a nonvolatile memory), and may store a variety of data at a nonvolatile memory.

The communication module 720 may include a cellular module 721, a Wi-Fi module 723, a Bluetooth (BT) module 725, a global navigation satellite system (GNSS) module 727 (e.g., a global positioning device (GPS) module, a global navigation satellite system (GLONASS) module, BeiDou module, or a Galileo module), a near field communication (NFC) module 728, and a radio frequency (RF) module 729.

The cellular module 721 may provide voice communication, video communication, a message service, an internet service, or the like through a communication network. According to an embodiment, the cellular module 721 may perform discrimination and authentication of the electronic device 701 within a communication network using the subscriber identification module (SIM) 724 (e.g., a SIM card), for example. According to an embodiment, the cellular module 721 may perform at least a portion of functions that the processor 710 provides. According to an embodiment, the cellular module 721 may include a communication processor (CP).

According to an embodiment, at least a part (e.g., two or more components) of the cellular module 721, the Wi-Fi module 723, the BT module 725, the GNSS module 727, and the NFC module 728 may be included within one integrated circuit (IC) or an IC package.

For example, the RF module 729 may transmit and receive a communication signal (e.g., an RF signal). The RF module 729 may include a transceiver, a power amplifier module (PAM), a frequency filter, a low noise amplifier (LNA), an antenna, or the like. According to various embodiments, at least one of the cellular module 721, the Wi-Fi module 723, the BT module 725, the GNSS module 727, or the NFC module 728 may transmit and receive an RF signal through a separate RF module.

The subscriber identification module 724 may include, for example, a card and/or embedded SIM that includes a SIM and may include unique identify information (e.g., IC card identifier (ICCID)) or subscriber information (e.g., international mobile subscriber identity (IMSI)).

The memory 730 may include an internal memory 732 or an external memory 734. For example, the internal memory 732 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 734 may include a flash drive, for example, compact flash (CF), secure digital (SD), micro-SD, mini-SD, extreme digital (xD), multimedia card (MMC), a memory stick, or the like. The external memory 734 may be functionally and/or physically connected with the electronic device 701 through various interfaces.

The sensor module 740 may measure, for example, a physical quantity or may detect an operation state of the electronic device 701. The sensor module 740 may convert the measured or detected information to an electric signal. The sensor module 740 may include at least one of a gesture sensor 740A, a gyro sensor 740B, a barometric pressure sensor 740C, a magnetic sensor 740D, an acceleration sensor 740E, a grip sensor 740F, a proximity sensor 740G, a color sensor 740H (e.g., red, green, blue (RGB) sensor), a biometric sensor 740I, a temperature/humidity sensor 740J, an illuminance sensor 740K, or an ultraviolet (UV) sensor 740M. Even though not illustrated, additionally or alternatively, the sensor module 740 may include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 740 may further include a control circuit for controlling at least one or more sensors included therein. According to an embodiment, the electronic device 701 may further include a processor which is a part of the processor 710 or independent of the processor 710 and is configured to control the sensor module 740. The processor may control the sensor module 740 while the processor 710 remains at a sleep state.

The input device 750 may include, for example, a touch panel 752, a (digital) pen sensor 754, a key 756, or an ultrasonic input unit 758. The touch panel 752 may use at least one of capacitive, resistive, infrared and ultrasonic detecting methods. Also, the touch panel 752 may further include a control circuit. The touch panel 752 may further include a tactile layer to provide a tactile reaction to a user.

The (digital) pen sensor 754 may be, for example, a portion of a touch panel or may include an additional sheet for recognition. The key 756 may include, for example, a physical button, an optical key, a keypad, or the like. The ultrasonic input device 758 may detect (or sense) an ultrasonic signal, which is generated from an input device, through a microphone (e.g., a microphone 788) and may check data corresponding to the detected ultrasonic signal.

The display 760 (e.g., the display 110) may include a panel 762, a hologram device 764, or a projector 766. The panel 762 may be implemented to be flexible, transparent or wearable, for example. The panel 762 and the touch panel 752 may be integrated into a single module. The hologram device 764 may display a stereoscopic image in a space using a light interference phenomenon. The projector 766 may project light onto a screen so as to display an image. The screen may be arranged inside or outside the electronic device 701. According to an embodiment, the display 760 may further include a control circuit that controls the panel 762, the hologram device 764, or the projector 766.

The interface 770 may include, for example, a high-definition multimedia interface (HDMI) 772, a universal serial bus (USB) 774, an optical interface 776, or a D-subminiature (D-sub) 778. Additionally or alternatively, the interface 770 may include, for example, a mobile high definition link (MHL) interface, an SD card/MMC interface, or an infrared data association (IrDA) standard interface.

The audio module 780 may convert a sound and an electrical signal in dual directions. The audio module 780 may process, for example, sound information that is input or output through a speaker 782, a receiver 784, an earphone 786, or a microphone 788.

The camera module 791 shooting a still image or a video may include, for example, at least one image sensor (e.g., a front sensor or a rear sensor), a lens, an image signal processor (ISP), or a flash (e.g., an LED or a xenon lamp).

The power management module 795 may manage, for example, power of the electronic device 701. According to an embodiment, a power management IC (PMIC) a charger IC, or a battery or fuel gauge may be included in the power management module 795. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 796 and a voltage, current or temperature thereof while the battery is charged. The battery 796 may include, for example, a rechargeable battery or a solar battery.

The indicator 797 may display a specific state of the electronic device 701 or a part thereof (e.g., the processor 710), such as a booting state, a message state, a charging state, or the like. The motor 798 may convert an electrical signal into a mechanical vibration and may generate a vibration effect, a haptic effect, or the like. Even though not illustrated, a processing device (e.g., a GPU) supporting a mobile TV may be included in the electronic device 701. The processing device supporting a mobile TV may process media data according to the standard of digital multimedia broadcasting (DMB), digital video broadcasting (DVB), MediaFlo™, or the like.

Each of the above-mentioned elements may be configured with one or more components, and the names of the elements may be changed according to the type of the electronic device. According to various embodiments, the electronic device may exclude some elements or may further include other additional elements. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. If the instructions are executed by a processor (e.g., the control module 150), the one or more processors may perform functions corresponding to the instructions.

The computer-readable storage media may include a hard disk, a floppy disk, a magnetic media (e.g., a magnetic tape), an optical media (e.g., a compact disc ROM (CD-ROM) and a digital versatile disc (DVD)), a magneto-optical media (e.g., a floptical disk), and hardware devices (e.g., a ROM, a RAM, or a flash memory). Also, a program instruction may include not only a mechanical code such as things generated by a compiler but also a high-level language code executable on a computer using an interpreter. The above-mentioned hardware device may be configured to operate as one or more software modules to perform operations according to various embodiments, and vice versa.

Modules or program modules according to various embodiments may include at least one or more of the above-mentioned elements, some of the above-mentioned elements may be omitted, or other additional elements may be further included therein. Operations executed by modules, program modules, or other elements may be executed by a successive method, a parallel method, a repeated method, or a heuristic method. Also, a part of operations may be executed in different sequences, omitted, or other operations may be added.

According to various embodiments of the present disclosure, an excellent user experience may be provided by providing a visual and tactile effect based on a pressure applied to an electronic device while minimizing power consumption of the electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a processor configured to perform an operation corresponding to a pressure value received from a sensor; and
    the sensor configured to:
        sense a pressure applied to the electronic device,
        when the sensed pressure, during a first time interval, changes to correspond to a first pressure interval, send a first pressure value, which represents the first pressure interval, to the processor,
        when the sensed pressure is sensed again, during the first time interval, as corresponding to the first pressure interval, omit resending the first pressure value to the processor during the first time interval,
        when the sensed pressure, during a second time interval, changes to correspond to a second pressure interval that is higher than the first pressure interval, send a second pressure value corresponding to the sensed pressure to the processor,
        when the sensed pressure, during a third time interval, changes to correspond to a third pressure interval that is higher than the second pressure interval, send a third pressure value, which represents the third pressure interval, to the processor, and
        when the sensed pressure, during a fourth time interval, changes to correspond to the second pressure interval, send a fourth pressure value corresponding to the sensed pressure to the processor.

2. The electronic device of claim 1, further comprising:
    a motor configured to generate vibration,
    wherein, if the second pressure value is received from the sensor, the processor is configured to generate a haptic effect by using the motor.

3. The electronic device of claim 2, wherein, if the second pressure value is received from the sensor, the processor is further configured to generate the haptic effect of a magnitude corresponding to the second pressure interval.

4. The electronic device of claim 2, wherein, if the second pressure value is received from the sensor, the processor is further configured to control the motor to generate the haptic effect during a time corresponding to the second time interval.

5. The electronic device of claim 1, further comprising:
    a display,
    wherein, if the second pressure value is received from the sensor, the processor is further configured to apply a blur effect to a screen of the display.

6. The electronic device of claim 5, wherein, if the second pressure value is received from the sensor, the processor is further configured to apply the blur effect, of a magnitude corresponding to the second pressure value, to the screen of the display.

7. The electronic device of claim 6,
    wherein, if the third pressure value is received from the sensor, the processor is further configured to turn off power to the display, and
    wherein the sensor is disposed on a right side of the electronic device or a left side of the electronic device to sense the pressure which is applied parallel to the display.

8. The electronic device of claim 1, further comprising:
    a display,
    wherein, if the second pressure value is received from the sensor, the processor is further configured to display a volume adjustment object on a screen of the display.

9. The electronic device of claim 8, wherein, if the second pressure value is received from the sensor, the processor is further configured to display the volume adjustment object, which has a volume adjustment interval corresponding to the second pressure value, on the screen of the display.

10. The electronic device of claim 8, wherein, if the second pressure value is received from the sensor, the processor is further configured to adjust a volume of the electronic device based on a speed of a flick manipulation of a user which occurs while the second pressure value is maintained.

11. The electronic device of claim 1, wherein, if another sensed pressure, which corresponds to a same pressure interval as a prior pressure value sent to the processor, is detected by the sensor and the same pressure interval is the first pressure interval or the third pressure interval, the sensor omits resending of the first pressure value or the third pressure value to the processor, respectively.

12. The electronic device of claim 1,
    wherein the sensor is further configured to:
        when the sensed pressure is sensed again, during the second time interval, changes to a fifth pressure value which corresponds to the second pressure interval, send the fifth pressure value corresponding to the sensed pressure, to the processor,
    wherein the second pressure value and the fifth pressure value, which both correspond to the second pressure interval, are different from each other, and
    wherein the sensed pressure during the second time interval corresponds to the second pressure interval.

13. A control method of an electronic device, the control method comprising:
    sensing, by a sensor, a pressure applied to the electronic device;
    sending, by the sensor to a processor, a first pressure value, which represents a first pressure interval, when the sensed pressure, during a first time interval, changes to correspond to the first pressure interval;
    omitting, by the sensor, to resend the first pressure value to the processor during the first time interval, while the sensed pressure is within the first pressure interval during the first time interval;
    sending, by the sensor to the processor, a second pressure value corresponding to the sensed pressure, when the sensed pressure, during a second time interval, changes to correspond to a second pressure interval that is higher than the first pressure interval;
    sending, by the sensor to the processor, a third pressure value, which represents a third pressure interval, to the processor if the sensed pressure changes to correspond to the third pressure interval that is higher than the second pressure interval;
    sending, by the sensor to the processor, a fourth pressure value corresponding to the sensed pressure, when the sensed pressure, during a fourth time interval, changes correspond to the second pressure interval; and
    performing, at the processor, an operation corresponding to a received pressure value.

14. The control method of claim 13, wherein the performing of the operation comprises:
    generating a haptic effect by using a motor if the second pressure value is received.

15. The control method of claim 14, wherein the generating of the haptic effect comprises:

generating the haptic effect of a magnitude corresponding to the second pressure interval.

16. The control method of claim 14, wherein the generating of the haptic effect comprises:
generating the haptic effect during a time corresponding to the second time interval.

17. The control method of claim 13, wherein the performing of the operation comprises:
applying a blur effect to a screen of a display if the second pressure value is received.

18. The control method of claim 17, wherein the applying of the blur effect comprises:
applying the blur effect, of a magnitude corresponding to the second pressure value, to the screen of the display.

19. The control method of claim 18,
wherein the performing of the operation comprises:
turning off power to the display if the third pressure value is received,
and
wherein the sensor is disposed on a right side of the electronic device or a left side of the electronic device to sense the pressure which is applied parallel to the display.

20. The control method of claim 13, wherein the performing of the operation comprises:
displaying a volume adjustment object on a screen of a display if the second pressure value is received.

21. The control method of claim 20, wherein the volume adjustment object includes a volume adjustment interval corresponding to the second pressure value.

* * * * *